Feb. 18, 1964 — R. E. LOESCH — 3,121,854

SWITCH AND MOUNTING MEANS

Filed Oct. 10, 1961 — 3 Sheets-Sheet 1

INVENTOR.
Ronald E. Loesch
BY
His Attorney

Feb. 18, 1964  R. E. LOESCH  3,121,854
SWITCH AND MOUNTING MEANS
Filed Oct. 10, 1961  3 Sheets-Sheet 2
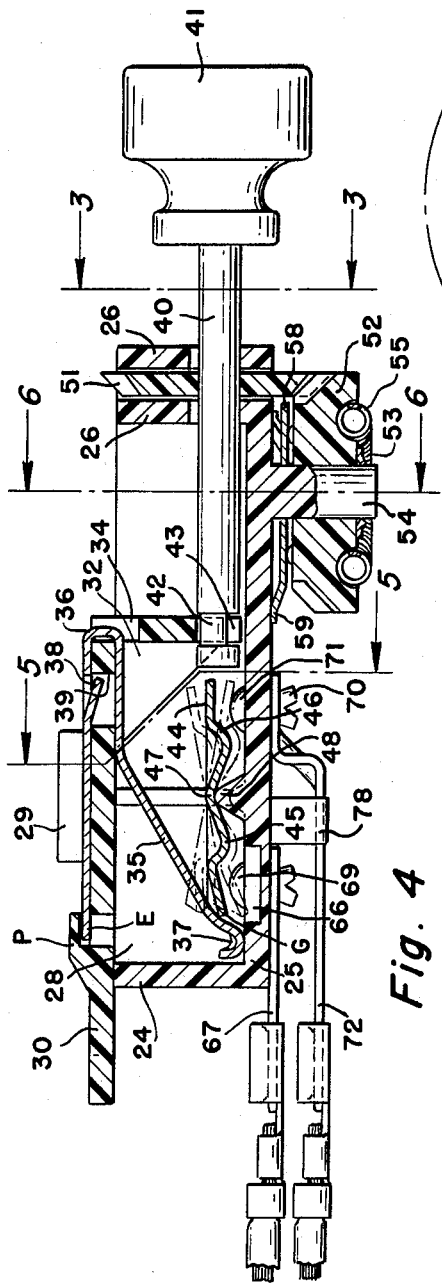
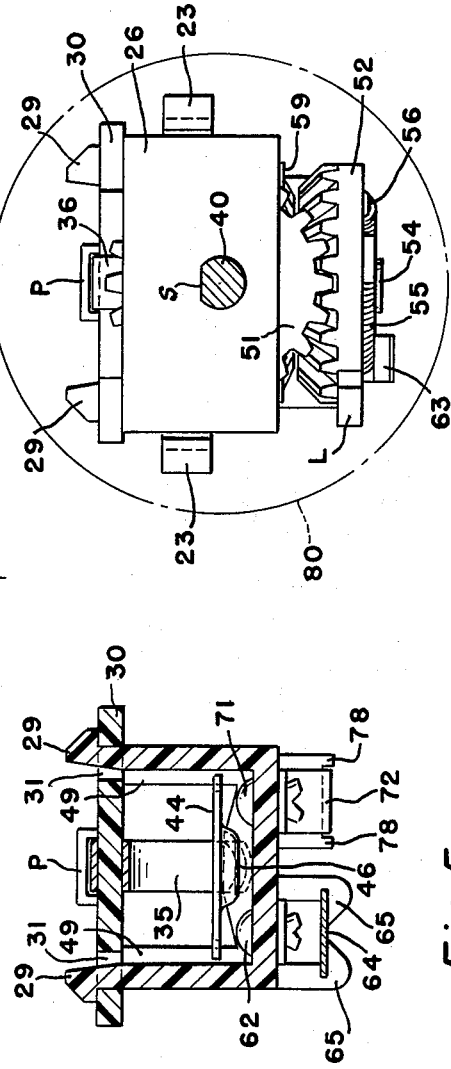
INVENTOR.
Ronald E. Loesch
BY
His Attorney Feb. 18, 1964  R. E. LOESCH  3,121,854
SWITCH AND MOUNTING MEANS
Filed Oct. 10, 1961  3 Sheets-Sheet 3

INVENTOR.
Ronald E. Loesch
BY
Albert T. H. Reuther
His Attorney

United States Patent Office

3,121,854
Patented Feb. 18, 1964

3,121,854
SWITCH AND MOUNTING MEANS
Ronald E. Loesch, Ravenna, Ohio, assignor to General Motors Corporation, Detroit, Mich., a corporation of Delaware
Filed Oct. 10, 1961, Ser. No. 144,236
7 Claims. (Cl. 338—173)

This invention relates to vehicle electrical devices and instruments for use on dashboard panels and the like, and, more particularly, to energization control and mounting of devices such as a radio, speedometer, windshield-wiper switch, ignition switch, cigar lighter and vehicle lighting switch means relative to a dashboard panel and the like.

An object of this invention is to provide a new and improved front mounting of a removable and replaceable electrical device per se readily and efficiently accessible by plug-in energization and mounting.

Another object of this invention is to provide a plug-in headlight control switch means for electrical device for use on motor vehicles and having a case or housing of moldable plastic material with integral laterally projecting lock arms which can snap into and protrude through sides of a switch receptacle provided on a dashboard or instrument panel of moldable plastic material such that squeeze of the arms toward each other can release the switch means from the instrument panel on a passenger side thereof.

Another object of this invention is to provide a plug-in vehicle headlight control switch means having a snap-fit cover and housing of moldable plastic material including a transverse fulcrum in a central cavity thereof relative to which a metal plate can teeter-totter or rock reciprocably into either of two positions for parking light and headlight energization in response to engagement by a resilient projection of a member carried by the cover which is slideable in differing positions along one side of the housing having integral locking arm means projecting therefrom for installation thereof from a passenger side of a vehicle instrument panel.

A further object of this invention is to provide a plug-in vehicle light control switch means having a snap-fit though slideable cover and housing of moldable plastic material with integral laterally projecting locking arm means on opposite sides of a journalling support for an actuator shaft fitted at one end to transfer moving force to the cover that carries a member for "off-on" energization positioning including alternate "on" positions as well as combination bus-bar male-blade terminal means mounted on one side of the housing, one of the terminal means having an extension which has a wiper-arm-like contact end engageable along an angular resistance-rheostat means journalled vertically for rotation in response to turning of the actuator shaft which is substantially transverse to the axis of rotation of the resistance-rheostat means forming a unitary assembly insertable and removable from a passenger side of a vehicle instrument panel mounting aperture.

Another object of this invention is to provide a plug-in vehicle light control switch means for use in combination with an instrument mounting dashboard panel means of a vehicle where space is limited and including a body portion of moldable insulating material relative to which a switch actuator shaft is carried for rotation axially thereof as well as to and fro reciprocation relative to external longitudinal splines on the shaft in mesh with miter gearing to transfer rotative movement to a rheostat means journalled for rotation in an axis substantially transverse to that of the shaft.

Further objects and advantages of the present invention will be apparent from the following description, reference being had to the accompanying drawings wherein preferred embodiments of the present invention are clearly shown.

In the drawings:

FIGURE 3 is an end view of the switch means of FIGURE 1.

FIGURE 4 is a cross-sectioned elevational view taken along line 4—4 in FIGURE 3.

FIGURE 5 is a cross-sectional view taken along line 5—5 in FIGURE 4.

In recent years various motor vehicle components including instrument panel or dashboard mounting means have been styled into various contours having complex curvature to conceal electrical connections as well as to provide greater safety so far as instrument mountings and crash pads are concerned. This curved contouring in many cases is such that electrical connections to various devices and instruments can be hard to reach behind a dashboard particularly in view of limited access space thereto. In a copending application S.N. 41,677, Woofter et al., filed July 8, 1960, and belonging to the assignee of the present invention, there is a disclosure concerning dashboard assemblies including an illustration of an instrument or dashboard mounting panel of moldable plastic material provided with socket-like portions or receptacles for various devices to be insertable from one side of the dashboard means. Features of the present invention are shown as adapted to a headlight switch and mounting means though it is to be noted that structural features thereof can easily be carried over to such items as a cigar lighter, ignition switch, windshield-wiper switch, and possibly such larger devices as a radio and speedometer. Further dashboard structures can be seen in a copending application S.N. 838,944, Mathues et al., filed September 9, 1959, now Patent No. 3,042,137, and belonging to the assignee of the present invention. The mounting panel or dashboard means can include suitable socket portions and electrical receptacles into which predetermined devices or instruments can be plugged and mounted.

Figure 1:
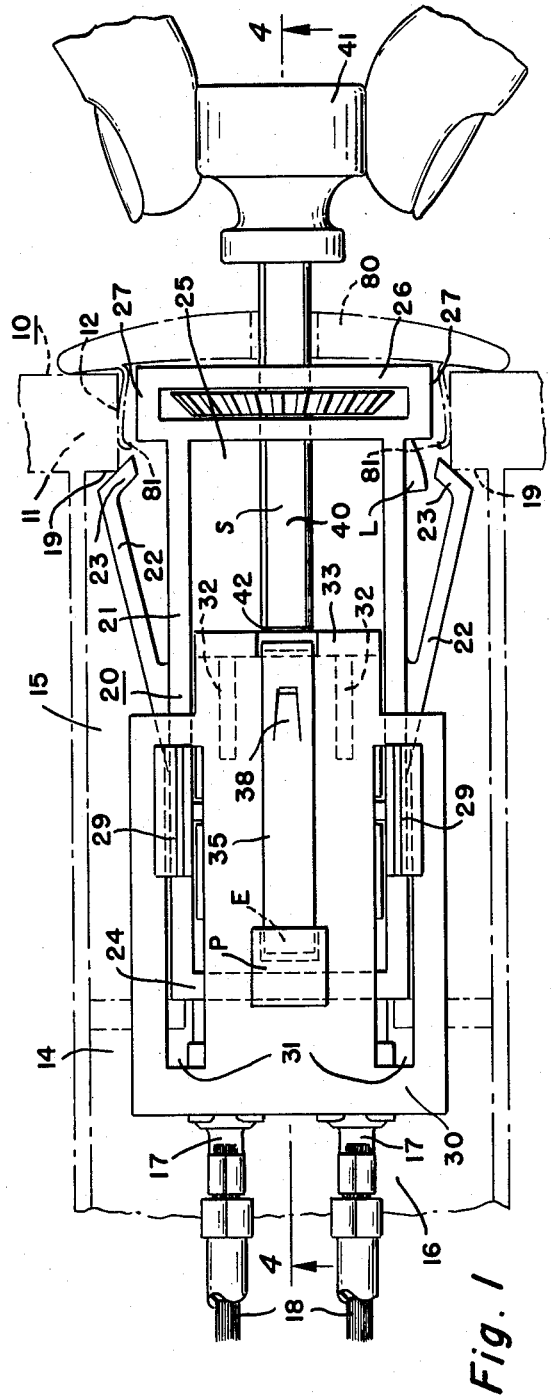
FIGURE 1 is a top view of a switch means with cover thereof in place as mounted relative to an instrument panel mounting in accordance with the present invention.
Figure 2:
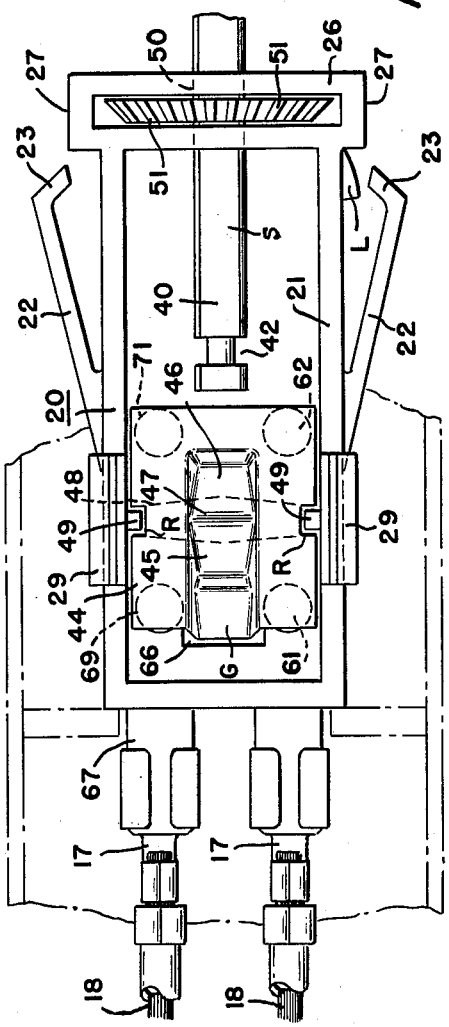
FIGURE 2 is a top view of the switch means of FIGURE 1 with the cover removed.

FIGURE 1 illustrates a portion of a mounting panel or dashboard means generally indicated by numeral 10 having a body portion of moldable material 11 provided with suitable aperturing 12 as well as a socket portion or receptacle 14 suitably carried by the body portion 11 of moldable material and integral therewith so as to provide a recess 15 and substantially transverse back or terminal-mounting portion 16 to which can be fitted female terminal means 17 having conductors or wiring 18 attached thereto as outlined in FIGURE 2. An example of suitable female terminal means can be found in a Patent 2,682,038, Johnson issued June 22, 1954, and belonging to the assignee of the present invention. It is to be understood that various socket terminal structures could be provided including three dimensional circuitry provided with a cast metal grid means as disclosed in a copending application belonging to the assignee of the present invention. In the structure of FIGURES 1 and 2, the transverse terminal mounting portion 16 can be located substantially in alignment with the aperture 12 on a side of the dashboard body portion 11 remote from a passenger compartment of a vehicle. A rear side of the dashboard body portion 11 can provide an abutment or shoulder 19 for purposes described in further detail in accordance with the present invention.

Figure 6:
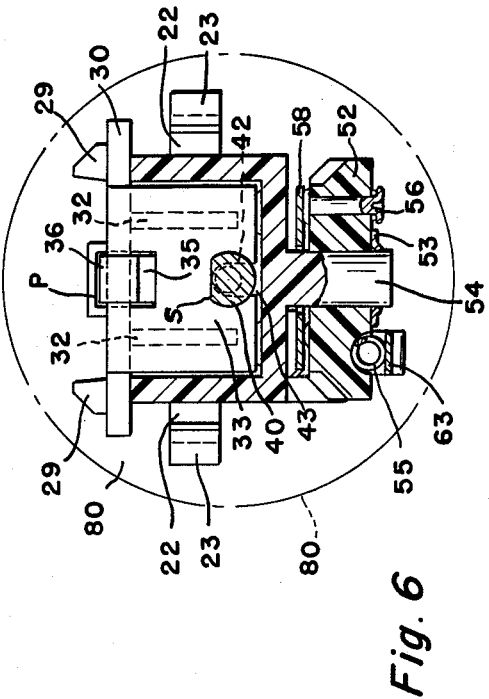
FIGURE 6 is a cross-sectional view taken along line 6—6 in FIGURE 4.

A switch and mounting means generally indicated by numeral 20 in the drawings can be inserted through the aperture 12 of the dashboard body portion 11 from a passenger compartment side thereof and this switch and mounting means 20 can include a generally rectangular body portion 21 of moldable insulating material having a pair of substantially parallel and longitudinally extending side walls integral with a pair of laterally outwardly extending locking arms or projections 22 which terminate at free ends as inwardly extending abutments 23 adapted to engage the shoulders 19 as can be best seen in FIGURE 1. These locking arms 22 form an acute angle relative to the side walls of the body portion 21 and the end abutments 23 are resiliently deflectable toward the side walls so as to permit insertion and removal through the aperture 12 during installation and replacement of a device relative to the dashboard means 10 from the passenger side thereof. The body portion 21 can include a rear transverse wall portion 24 integral with the side walls of the body portion 21 as well as a bottom 25 and a front transverse recess-forming or slotted and substantially parallel front end dual wall portion 26 having ends 27 on opposite sides thereof extending beyond an outer surface of each of the side walls of the body portion 21. The bottom 25 together with the side walls and integral rear end wall 24 and dual front partitioning or walls 26 can form a central cavity 28 located generally between a pair of upwardly extending projections 29 provided with laterally outwardly extending hooked ends and integral with the side walls of the body portion 21 though adapted to be flexed toward each other for a limited distance so as to permit interlocking thereof with a cover 30 visible in all views of the drawings except that of FIGURE 2. The cover 30 has a generally L-shaped configuration and includes a pair of substantially parallel longitudinally extending slots 31 therein located laterally outside a pair of fillets or triangular strengthening rib portions 32 integral with the cover 30 and the transverse end extension portion 33 thereof. These fillets or strengthening ribs 32 can be seen as indicated in views of FIGURES 1, 4 and 6 of the drawings. At a juncture between the transverse extension portion 33 and the cover 30 there is a central opening or slot 34 through which a resilient metal member 35 can be fitted to have a U-shaped end 36 thereof straddle the cover 30 such that a wiper end 37 integral with the resilient member 35 projects into the cavity 28 and in an "off" position of the switching rests against the bottom 25 with the rear wall portion 24 serving as a backstop or limit for rearward movement of the resilient metal spring-like member 35. Adjacent to the U-shaped end 36 of the resilient member 35 there is a locking tang 38 that abuts against a shoulder 39 formed by a cutout in the cover 30 and this tang 38 locks the resilient member 35 to the cover 30 together with a stabilizing end E of the metal member 35 which extends longitudinally between the slots 31 to fit in locking engagement with a pocket portion P integral and extending upwardly from the cover 30 above a cutout or recess in a location intermediate the parallel slots 31 of the cover. The projecting ends 29 of the side walls of the body portion 21 can serve as limit stops for to and fro reciprocable movement of the cover 30 effected by a shaft-like plunger or actuator 40 which can be provided with a knob end 41 as indicated in FIGURE 1 and adapted to be controlled manually by an operator or passenger of the motor vehicle. An end of the actuator or plunger 40 remote from the knob 41 can have a laterally inwardly extending groove 42 thereof fit into a central slot 43 of the end extension portion 33 of the cover 30 such that to and fro reciprocable movement of the actuator or shaft 40 can effect shifting of the cover 30 carrying the resilient member 35 therewith into engagement with a pivotal plate or contact portion 44 having a pair of depressions 45 and 46 on opposite sides of an intermediate bearing portion 47 which is pivotally journalled along an underside thereof over a fulcrum portion 48 recessed between inward projections 49 integral with the side walls of the body portion 21 in locations substantially intermediate each of the end projections 29. The contact plate portion 44 has a pair of intermediate and laterally inwardly extending recesses R adapted to complement and provide a polarizing fit relative to inward projections 49 of the side walls of the body portion 21 and the plate 44 can teeter-totter or rock back and forth over the fulcrum portion 48 integral with the floor or bottom 25 of the body portion 21.

Figure 7:
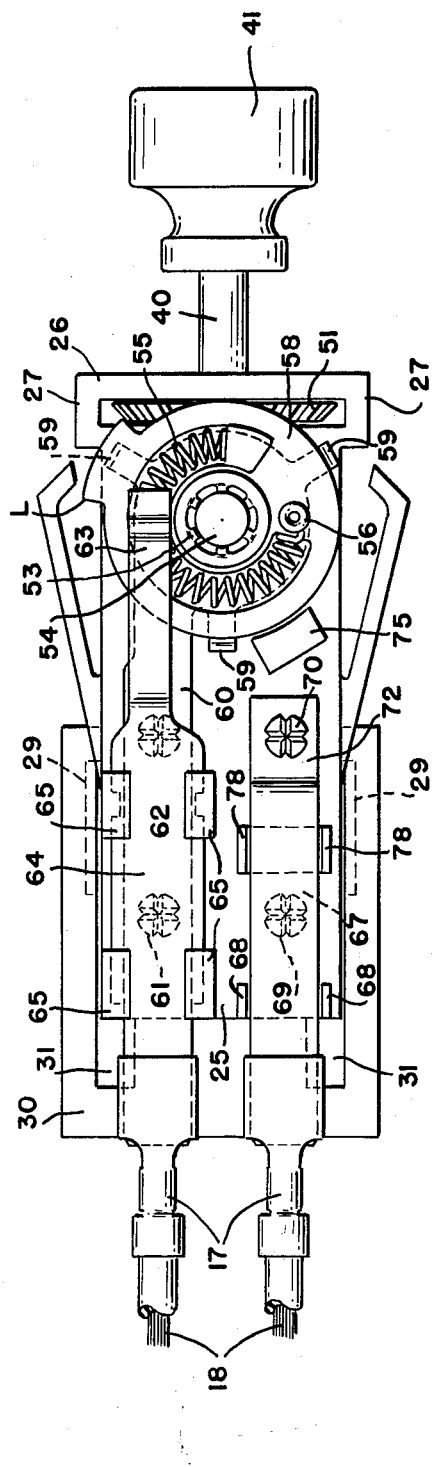
FIGURE 7 is a bottom view of the switch means of FIGURES 1 and 2.

The actuator or plunger means 40 has splines 50 centrally thereon and extending longitudinally thereof to engage complementary dovetail fit of gearing 51 having external teeth in mesh with complementary miter gear member 52 that is held by a spring angular metal clip 53 centrally apertured and press-fitted to a shaft-like portion 54 integral with the bottom 25 of the body portion 21. This shaft portion 54 can be seen in views of FIGURES 4 and 7 and a resistance or angular coiled rheostat means 55 is fitted concentrically to one side of the gear means 52 for movement therewith concentrically around the shaft portion 54. One end of this resistance or coiled rheostat means 55 has a contact or rivet means 56 that extends axially through the gear means 52 and is in engagement with an angular spring portion 58 having resilient outwardly projecting tabs 59 abutting against an underside of the bottom 25 of the body portion 21 along which a bus-bar combination terminal means 60 integral therewith is located. This combination bus-bar terminal means 60 and integral angular contact portion 58 can be held to the bottom 25 by a pair of fasteners or rivet means 61 and 62 visible in FIGURES 2, 5, as well as 6 and 7. The combination bus-bar terminal means and integral angular contact portion as designated by reference numerals 60 and 58, respectively, can be energized from a source of power such as a battery, alternator and the like of a motor vehicle. The resistance or coil rheostat means 55 is engaged by an end 63 of a combination wiper-arm terminal means 64 which is mounted and carried in grooves of J-shaped carriers or extension portions 65 integral with an underside of the bottom or floor 25 of the body portion 21. It is to be understod that suitable terminal means mate with the combination terminal means or members 60 and 64. The combination wiper-arm terminal means 64 can be connnected to suitable conductors and circuitry for energization of instrument lights which can be bright as well as dim by use of the resistance or rheostat means 55 in series therewith. The bottom or floor portion 25 of the body portion 21 has a recess 66 therein located to one side of the fulcrum portion 48 and adapted to be complementary to a guide end G of the contact plate 44 to facilitat e sliding engagement of the wiper end 37 of the resilient member 35 onto the plate 44. The plate 44 can establish electrical interconnection between heads of fastening devices such as a fastener or rivet means 61 and a further blade-like shortened terminal 67 visible in views of FIGURES 2, 4, 5, 6 and 7 though hidden or obscured in the last three views. The blade-like terminal 67 can be securely held to an underside of the floor or bottom 25 between a pair of substantially parallel integral projections 68 and by a fastener or rivet means 69 visible in views of FIGURES 2 and 7. The blade-like terminals 67 can establish energization of parking lights on a motor vehicle whenever the wiper end 37 positively pivots the contact plate 44 into a bridging position across the fasteners 61 and 69 to establish electrical interconnection between the terminal means 60 and terminal 67. The wiper arm 37 engages the depression 45 as indicated in phantom positioning of the arm end 37 in FIGURE 4 relative to the contact plate 44 in this parking light energizing position.

Similarly, the wiper arm end 37 can engage the depression 46 of the contact plate 44 on an opposite side of the fulcrum portion 48 so as to have the plate 44 engage the fastener 62 having a head portion inside the cavity 28 and electrically energized from the terminal means 60 so as to establish electrical energization of vehicle headlights by way of a fastener or rivet means 70 having a head portion 71 thereof engaged by an underside of the contact plate 44 while an L-shaped terminal meber 72 having a blade-like end can be suitably connected to female terminal means attached to conductors or wiring of circuitry to energize vehicle headlights. The movement of actuator or plunger 40 is controlled to be reciprocable relative to a flat side S thereof visible in FIGURES 2 and 3 as well as in FIGURE 6 and the gearing 51 has a complementary hole therein to give a spline-like interfit therewith such that the flat side can permit axial and linear movement to and fro of the actuator though turning of the actuator 40 will effect either clockwise or counterclockwise rotation of the miter gear member 52 within limits governed by a lateral portion L integral with the gear 52 and adapted to engage a downwardly projecting stop portion 75 integral with the bottom or floor 25 of the body portion 21. The terminal member 72 can be held by the fastener or rivet means 70 as well as by a pair of downwardly extending projections 78 integral with an underside of the bottom or floor 25 of the body portion 21. It is to be noted that the lateral recesses R of the contact plate 44 can have a relatively snug relation to the inward projections 49 such that normally the contact plate 44 is centered in a substantially horizontal position and out of contact with the fasteners or rivet means to establish interconnection of the energizing terminal means 60 and parking lights as well as the headlights energized by way of other terminal members. The entire switch and mounting means 20 can be easily inserted and removed from the panel aperture 12 from the passenger side of a motor vehicle with a relatively straight in and out movement. As the switch means is seated relative to the panel on one side thereof a trim plate 80 indicated in views of FIGURES 1, 3 and 6 can cover the aperture 12 and can provide external covering removable to gain access to the resilient arms 22. The trim plate 80 can have resilient spring fingers 31 therewith and these spring fingers 81 can engage a periphery of the mounting panel body portion 11 defining the aperture 12. These spring fingers 81 are outlined in FIGURE 1 of the drawings. It is to be noted that the rocking of the contact plate 44 can establish interconnection of the power feeding circuit by way of the terminal means 60 to the proper lighting circuits for the parking lights as well as the headlights and simultaneously the instrument panel illumination. The contact plate 44 has two positions for establishing the energization of the parking and headlights. The third position actually does not effect the contact plate directly and it is possible for the feed of power to be disconnected when the wiper arm end 37 of the resilient member 35 is in the "off" position.

It is to be noted that the resistance or rheostat means 55 is mounted transversely and externally relative to the body portion 21 and actuator 40 and this facilitates cooling of the resistance or rheostat means. The stationary shaft portion 54 around which the rheostat means is journalled is perpendicular to the center line of the switch actuator or plunger 40 and turning of this actuator plunger is transmitted to the rheostat through miter gearing by rotating the plunger or actuator 40. Mounting the rheostat in this position makes it possible to decrease the overall length of the switch which in turn simplifies the receptacle portion 14—16 into which the switches plug. It is to be noted that the trim coverplate 80 can be permanently attached to the front of the switch body portion 21 or can be a separate member to facilitate access to the flexible locking arms 22 which can be squeezed together to release the body portion 21 for removal from the dashboard means 10.

Similar locking arm portions 22 can be provided on housings of cigar lighter, ignition switch means, as well as windshield wiper switch means and possibly such larger items as a radio and speedometer assembly. It is to be noted that the switch body 21 and cover 30 are molded of flexible thermoplastic material and the projections 29 fitting into slots 31 permit snap fit of these parts to each other thus eliminating any need for separate fastening devices.

While the embodiments of the invention herein disclosed constitute preferred forms, it is to be understood that other forms might be adopted.

What is claimed is as follows:

1. For use in combination with a vehicle instrument panel having a socket and terminal means therewith, a plug-in headlight control switch means, comprising, the housing of moldable plastic material with integral laterally projecting hook arms which can snap into fitting engagement peripherally with the instrument panel at the socket thereof, a resilient metal member mounted on a movable cover also of moldable plastic material fitted to one side of said housing, and actuator means carried by said housing and fitted at one end thereof to said cover for movement thereof, and bus-bar-like contact portions carried by said housing in predetermined locations so as to mate with the terminal means of the instrument panel socket, and a rocker plate of metal fulcrummed by said housing and engageable by said resilient metal member mounted on said cover, said rocker plate under urging of said resilient metal member serving to interconnect predetermined bus-bar-like contact portions for alternate selective electrical energization of parking as well as headlights of a vehicle.

2. The combination of claim 1 wherein said contact portions have blade-like ends to mate with the terminal means, said contact portions having a dove-tail fit on one side of said housing.

3. The combination of claim 1 wherein a resistance means is rotatably mounted on a side of said housing in a position substantially transverse though geared to be driven by said actuator means, and transverse position of said rotatably mounted resistance means effecting a reduction in overall length of the switch means and providing access of cooling air thereto.

4. The combination of claim 1 wherein said cover is generally L-shaped and has a pair of substantially parallel cutouts into which housing wall projections are snap-fitted to be guided in sliding to and fro movement effected by said actuator means, said cover also having a slot to fit a reduced diameter adjacent to an end of said actuator means.

5. A plug-in vehicle electrical light control device, comprising, a housing of moldable plastic material with integral laterally projecting locking arm means on opposite sides thereof, a slidable cover of insulating material to snap-fit into assembly with said housing, a shaft-like actuator means journalled by said housing and having one end attached to said cover, though said actuator means is rotatable as well as reciprocable in to and fro directions, a resilient metal means carried by said cover, a rocker plate portion of conducting material fulcrummed by said housing and engaged for alternate positioning by said resilient metal means in response to sliding movement of said cover attached to said actuator means, a plurality of bus-bar-like contact portions carried by said housing in predetermined locations, one of said contact portions including an annular contact end for supply of power to a rheostat means journalled on one side of said housing and shiftable by said actuator means, another of said contact portions having a wiper arm end integral therewith to tap said rheostat means for dimming control of vehicle instrument panel lighting, said rocker plate portion serving to interconnect predetermined pairs of contact portions for alternate energization of vehicle parking lights and headlights concurrently with dimming control of panel lighting, said rheostat means being movable about an axis substantially transverse to that of said actuator means.

6. A vehicle light control switch means comprising, a snap-fit though slidable cover and housing of moldable plastic material, an actuator portion carried by said housing and having one end fitted to said cover for effecting to and fro movement of said cover, a pivotable member of conducting material journalled in space between said housing and cover, and a resilient means carried by said cover and having a free end engageable on said pivotable member to urge alternate positioning thereof for energization of differing lighting in response to shift of said cover as effected by said actuator portion, said housing including a shaft-like portion projecting laterally therefrom, a resistance means journalled for rotation about said shaft-like portion, and geared drivingly to interconnect said actuator portion with said rotatably journalled resistance means.

7. A vehicle light control switch means comprising, a snap-fit though slidable cover and housing of moldable plastic material, an actuator portion carried by said housing and having one end fitted to said cover for effecting to and fro movement of said cover, a pivotable member of conducting material journalled in space between said housing and cover, and a resilient means carried by said cover and having a free end engageable on said pivotable member to urge alternate positioning thereof for energization of differing lighting in response to shift of said cover as effected by said actuator portion, said housing including a pair of opposite lateral projections extending integrally for locking engagement with the peripheral opening of a vehicle dashboard panel, said switch means, housing and cover being insertable and removable from the front of the panel for easy access rather than from behind where access is difficult and limited.

References Cited in the file of this patent
UNITED STATES PATENTS
1,215,807 Huff _____ Feb. 13, 1917
FOREIGN PATENTS
1,123,495 Great Britain _____ June 11, 1956